(12) United States Patent
Peterson (10) Patent No.: US 10,119,620 B2
(45) Date of Patent: Nov. 6, 2018

(54) THERMAL MANAGEMENT VALVE

(71) Applicant: Flextronics Global Services Canada Inc. Services Globaux Flextronics Canada Inc., Toronto (CA)

(72) Inventor: Matthew Peterson, Ada, MI (US)

(73) Assignee: FLEXTRONICS GLOBAL SERVICES CANADA INC. SERVICES GLOBAUX FLEXTRONICS CANADA INC., Toronto (CA)

( * ) Notice: Subject to any disclaimer, the term of this patent is extended or adjusted under 35 U.S.C. 154(b) by 59 days.

(21) Appl. No.: 14/300,308

(22) Filed: Jun. 10, 2014

(65) Prior Publication Data

US 2015/0059897 A1    Mar. 5, 2015

Related U.S. Application Data

(60) Provisional application No. 61/872,178, filed on Aug. 30, 2013, provisional application No. 61/919,304, filed on Dec. 20, 2013.

(51) Int. Cl.
*F16K 31/06* (2006.01)
*F16K 11/044* (2006.01)

(52) U.S. Cl.
CPC ........ *F16K 11/044* (2013.01); *F16K 31/0627* (2013.01); *F16K 31/06* (2013.01); *Y10T 137/86815* (2015.04); *Y10T 137/86879* (2015.04)

(58) Field of Classification Search
CPC .... F16K 31/0627; F16K 31/06; F16K 11/044; Y10T 137/86815; Y10T 137/86879

USPC .......................................... 137/625.4, 625.48
See application file for complete search history.

(56) References Cited

U.S. PATENT DOCUMENTS

| | | | | |
|---|---|---|---|---|
| 466,026 | A * | 12/1891 | Wallis | F16K 11/044 137/112 |
| 4,623,002 | A * | 11/1986 | Schoonover | B01J 4/001 137/340 |
| 4,641,686 | A | 2/1987 | Thompson | |
| 4,828,220 | A * | 5/1989 | Hashimoto | F16K 31/007 137/625.4 |
| 5,586,745 | A * | 12/1996 | Knapp | F16K 1/54 251/121 |
| 5,597,009 | A * | 1/1997 | Scherrer | F16K 51/02 137/375 |

(Continued)

FOREIGN PATENT DOCUMENTS

| | | |
|---|---|---|
| DE | 93 04 057 U1 | 5/1993 |
| DE | 10 2010 012 413 A1 | 9/2011 |
| DE | 20 2011 107 875 U1 | 2/2012 |

(Continued)

*Primary Examiner* — Matthew W Jellett
*Assistant Examiner* — Christopher Ballman
(74) *Attorney, Agent, or Firm* — Volpe and Koenig, P.C.

(57) ABSTRACT

A three-port fluid control valve and a valve assembly using the fluid control valve are provided herein. The valve includes a first inlet, a second inlet, and a sealing element to selectably open one inlet to fluid communication with an outlet and to close the other inlet to fluid communication with the outlet. The valve system includes an actuator, for example a solenoid, to provide accurate and responsive control of the position of the sealing element.

20 Claims, 6 Drawing Sheets

(56) References Cited

U.S. PATENT DOCUMENTS

2003/0145893 A1\* 8/2003 Kweon .............. F16K 11/044
 137/625.5
2010/0107669 A1\* 5/2010 Wada .................. F16K 11/044
 62/196.1

FOREIGN PATENT DOCUMENTS

| EP | 2700853 A1 \* | 2/2014 | ............ F16K 11/044 |
| FR | 2 353 777 | 12/1977 | |
| GB | 2 320 311 A | 6/1998 | |

\* cited by examiner

Fig. 2D

THERMAL MANAGEMENT VALVE

CROSS REFERENCE TO RELATED APPLICATIONS

This application claims the benefit of U.S. Provisional Applications Nos. 61/872,178, filed on Aug. 30, 2013, and 61/919,304, filed on Dec. 20, 2013, which are incorporated by reference as if fully set forth.

FIELD OF INVENTION

Embodiments of the present invention generally relate to fluid control valves. More particularly, embodiments of the present invention are related to a three port fluid control valve having two inputs on one outlet in which the valve can direct one of the two inputs to the outlet.

BACKGROUND

Some mechanical systems include a thermal management system to direct a fluid with a heat transfer capability to a heater or a cooler depending on a characteristic of the fluid, for example the fluid temperature. For example, some automotive transmission systems include a fluid control valve as a thermal management valve to selectively direct the flow of transmission oil from an oil cooler or an oil heater to a transmission oil reservoir, or sump. During initial transmission warm-up, the transmission oil from the transmission is directed to an oil heater to accelerate attaining optimum operating temperature conditions. At normal operating temperatures, the oil is directed to an oil cooler to maintain optimum operating temperature. A fluid control valve, sometimes referred to as a thermal management valve, is used to direct the flow from the oil heater or cooler to the sump depending on transmission operating conditions, for example transmission oil temperature.

Currently, thermal management valves use a wax motor to sense oil temperature and respond by actuating a thermal management valve. However, wax motors may be inaccurate, unreliable, and slow to react to operating conditions.

Accordingly, a need exists for a thermal management valve that overcomes these shortcomings.

SUMMARY

Embodiments of a fluid control valve and a valve assembly including the fluid control valve are provided herein. In some embodiments, the control valve comprises a housing having a first valve body having an outlet, a first inlet channel, and a first cavity formed through an upper surface in fluid communication with the first inlet. The housing also includes a second valve body having a second inlet channel and a second cavity formed through a bottom surface and having a lip in fluid communication with the second inlet, such that the outlet is in selectable fluid communication with the first inlet and the second inlet. The first valve body is disposed atop the second valve body with the upper surface coupled to the bottom surface in a fluid tight manner.

A valve member including a valve stem and a sealing element disposed on a portion of the valve stem is supported within the housing for displacement between at least a first valve position and a second valve position; wherein the first valve position opens the outlet to fluid communication with the first inlet and closes the outlet to fluid communication with the second inlet, and the second valve position opens the outlet to fluid communication with the second inlet and closes the outlet to fluid communication with the first inlet.

In some embodiments, a fluid control valve assembly comprises a housing having a first inlet channel, a second inlet channel, and an outlet in selectable fluid communication with the first inlet and the second inlet and an actuator having a movable armature supported for linear displacement between at least a first position and a second position. A valve member including a sealing element is coupled to the armature and supported within the housing for displacement between at least a first valve position and a second valve position in response to the linear displacement of the armature. The first valve position opens the outlet to fluid communication with the first inlet and closes the outlet to fluid communication with the second inlet, and the second valve position opens the outlet to fluid communication with the second inlet and closes the outlet to fluid communication with the first inlet.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to an automotive transmission fluid control valve, the present invention may be modified for a variety of applications while remaining within the spirit and scope of the claimed invention, since the range of the potential applications is great, and because it is intended that the present invention be adaptable to many such variations.

DETAILED DESCRIPTION

Figure 1A:
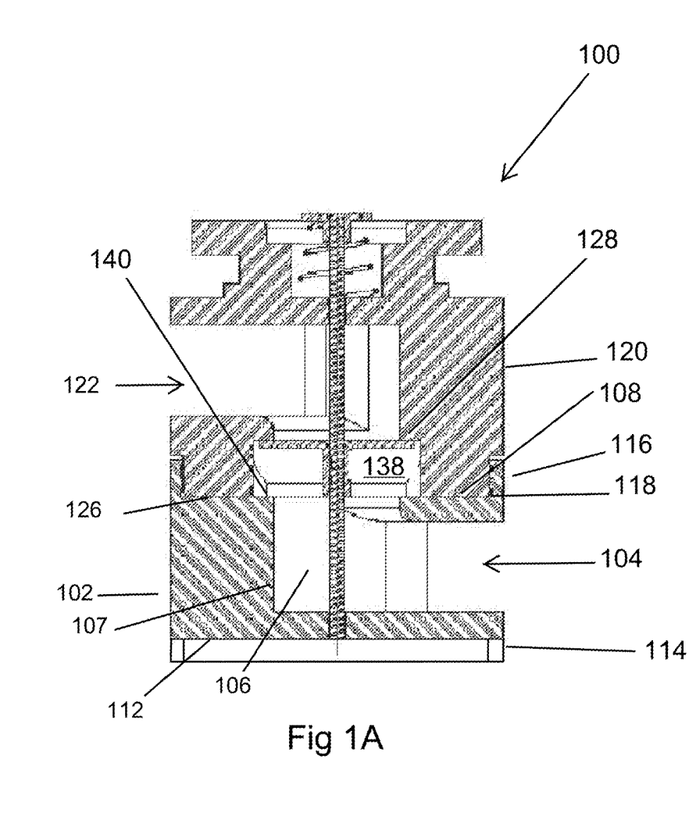
FIG. 1A depicts a front sectional view of a fluid control valve in a first position in accordance with an embodiment of the present invention.
Figure 1B:
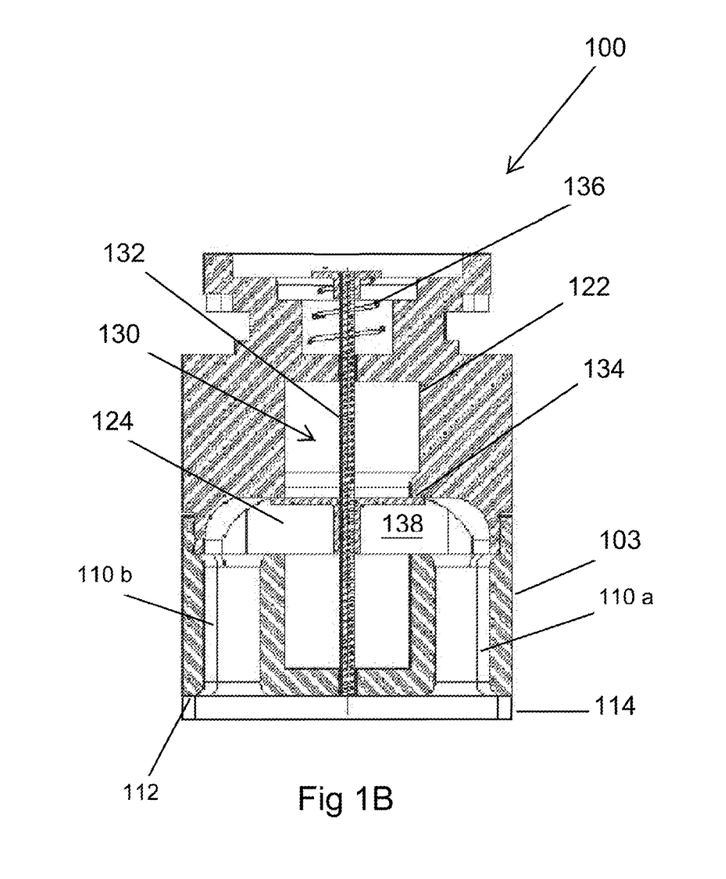
FIG. 1B depicts a side sectional view of the valve of FIG. 1A.

FIGS. 1A and 1B depict a non-limiting fluid control valve, valve 100, in accordance with an embodiment of the present invention in a first position. As shown in FIG. 1A, the valve 100 has a first valve body 102 including a first inlet channel, inlet 104, formed through the side wall of the valve body 102 and a first cavity 106 in fluid communication with the first inlet 104. The first cavity 106 is formed through an upper surface 108 of the first valve body 102.

As illustrated in FIG. 1B, the first valve body 102 includes outlet passages 110a and 110b, collectively outlet 110, formed through a lower surface 112 of the first valve body 102 and extending through the upper surface 108. Two passages 110a, 110b are illustrated, although one passage or more than two passages may be used without departing from the scope of the invention.

A lower portion 114 of the first valve body 102 may be configured for coupling with, for example, a receiver such as a sump (not shown) or a conduit (not shown). The coupling may be a fluid-tight coupling, i.e., the coupling prevents, or substantially prevents, leakage of a fluid flowing in the valve 100 through the interface 118 during normal operating conditions for the valve 100. The configuration of the lower portion 114 may include internal or external threads, a snap fit detail to couple with the receiver, or other construction to facilitate the coupling.

In other embodiments, the outlet 110 may be formed through a side wall of the first valve body 102. The outlet 110 formed through a side wall may be arranged perpendicular to the first inlet 104, parallel to the first outlet, or at other orientations. The outlet 110 may be then coupled to a receiver or a conduit, as discussed above.

The upper portion 116 of the first valve body 102 is configured in a similar fashion to facilitate coupling to a bottom surface 126 of a second valve body 120. In some cases, the coupling between the bottom surface 126 of the second valve body 120 and the upper surface 108 of the first valve body 102 is a fluid-tight coupling. The second valve body 120 has second inlet channel, inlet 122, formed through a side wall of the second valve body 120 and a second cavity 124 formed through the bottom surface 126 such that the inlet 122 and the second cavity 124 are in fluid communication. A lip 128 is formed at the end of the second cavity 124 opposite the bottom surface 126.

Arranged with the second valve body 120 atop the first valve body 102 as illustrated in FIGS. 1A-1D, assembly of the valve 100 may beneficially be simpler and may facilitate sealing of the first and second valve bodies 102, 120.

In the exemplary embodiment illustrated, the second cavity 124 is radially larger than the first cavity 106. When the first and second valve bodies 102, 120 are coupled together, the outer wall 125 bounding the second cavity 124 is disposed outward from the outer wall 107 of the first cavity 106, forming a ledge 140.

Figure 1C:
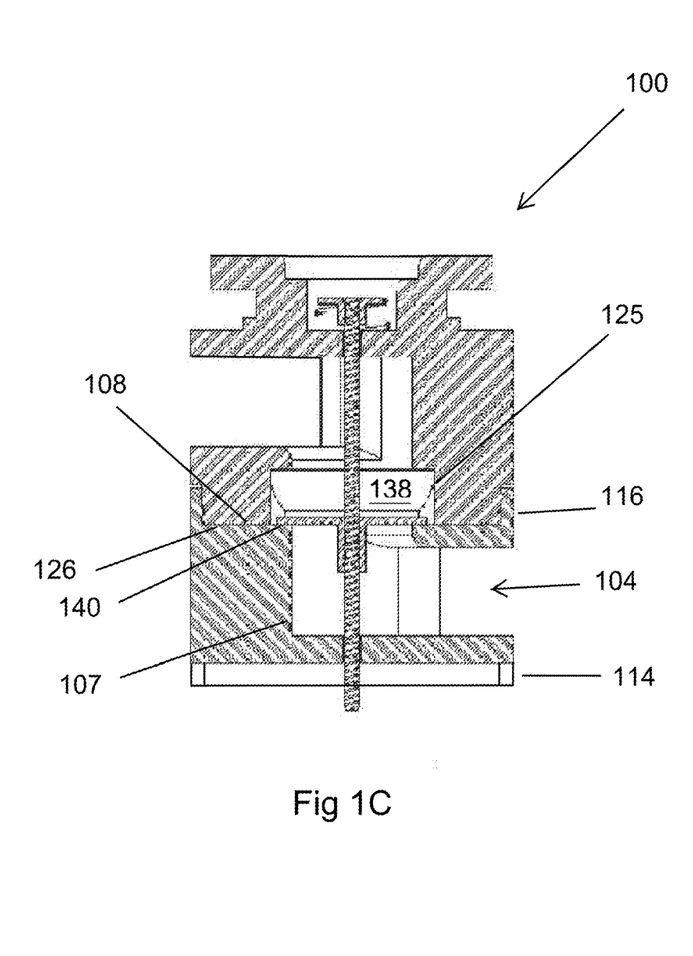
FIG. 1C depicts a front sectional view of a fluid control valve in a second position in accordance with an embodiment of the present invention.
Figure 1D:
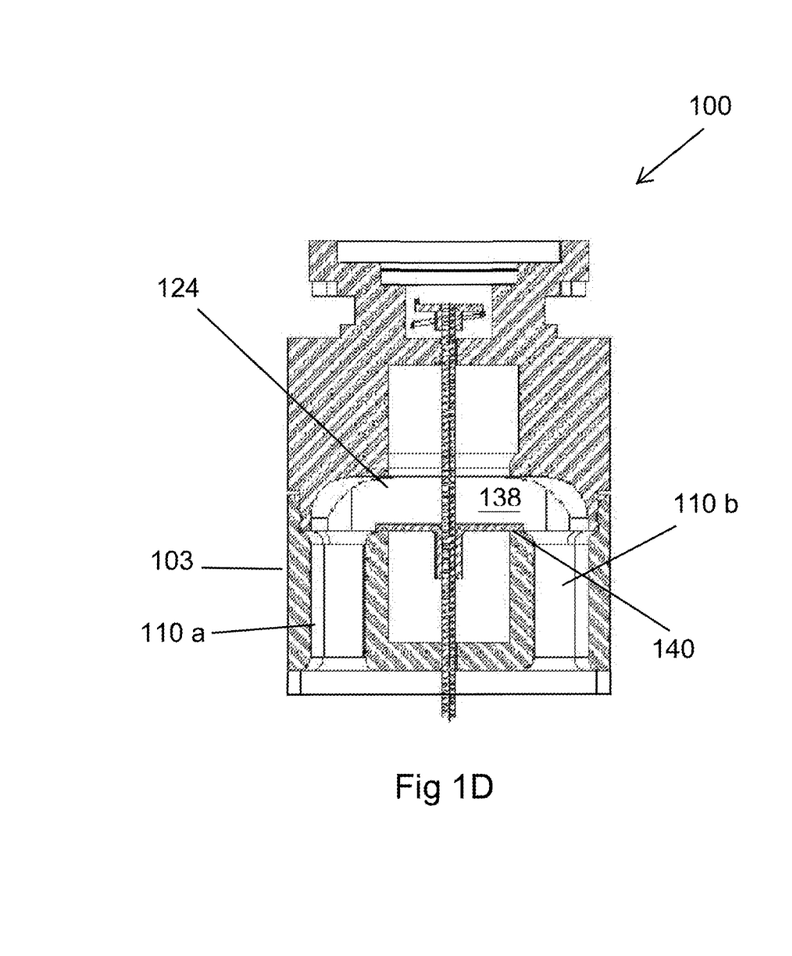
FIG. 1D depicts a side sectional view of the valve of FIG. 1C.

As illustrated in FIGS. 1B and 1D, when the first valve body 102 and the second valve body 120 are coupled, the outlet 110, comprising passages 110a and 110b, are in fluid communication with the second cavity 124. For ease of illustration only, the outlet passages 110a and 110b are depicted between the outer wall 107 of the first cavity 106 and the outer side wall 103 of the first valve body. The passages 110a, 110b may be placed elsewhere within the first valve body 102. The fluid communication between the second cavity 124 and the outlet 110 is not affected by the position of the sealing element 134.

A valve member 130 including a valve stem 132 and a sealing element 134 disposed on a portion of the valve stem 132 is disposed within the first and second valve bodies 102, 120 and supported for displacement between at least a first valve position (FIGS. 1A and 1B) and a second valve position (FIGS. 1C and 1D). The sealing element 134 is disposed within the second cavity 124 and sized and shaped to selectably close the first inlet 104 or the second inlet 122 from fluid communication with the outlet 110 as discussed in greater detail below, thus providing selectable fluid communication between the outlet 110 and the first or second inlet 104, 122, respectively. For ease of illustration only, the sealing element 134 is depicted as a disk having upper and lower flat surfaces to contact the valve bodies in FIGS. 1A-1D. Other suitable shapes for the contact surfaces include, but are not limited to, conical and spherical surfaces.

In the first valve position (FIGS. 1A and 1B), the sealing element 134 abuts the lip 128 surrounding the second cavity 124, forming a plenum 138 bounded by the sealing element 134, the second cavity 124, and a portion of the upper surface 108. With the valve member positioned as illustrated in FIGS. 1A-1B, the second inlet 122 is closed to fluid communication with the outlet 110 and the first inlet 104 and the plenum 138 are open to fluid communication with the outlet 110. A resilient member 136, for example a spring, is provided to urge the valve stem 132 in the direction corresponding to the first valve position of FIGS. 1A, 1B.

In the second valve position (FIGS. 1C and 1D), the valve member 130 is displaced downwardly from the first position to abut the upper surface 108 of the first valve body around the perimeter of the first cavity 106, forming a plenum 138 as above. The second valve position places the sealing element 134 against the ledge 140. With the valve member 130 in the second valve position as illustrated in FIGS. 1C-1D, the first inlet 104 is closed to fluid communication with the outlet 110, and the second inlet 122 and the plenum 138 are open to fluid communication with the outlet 110.

Figure 2A:
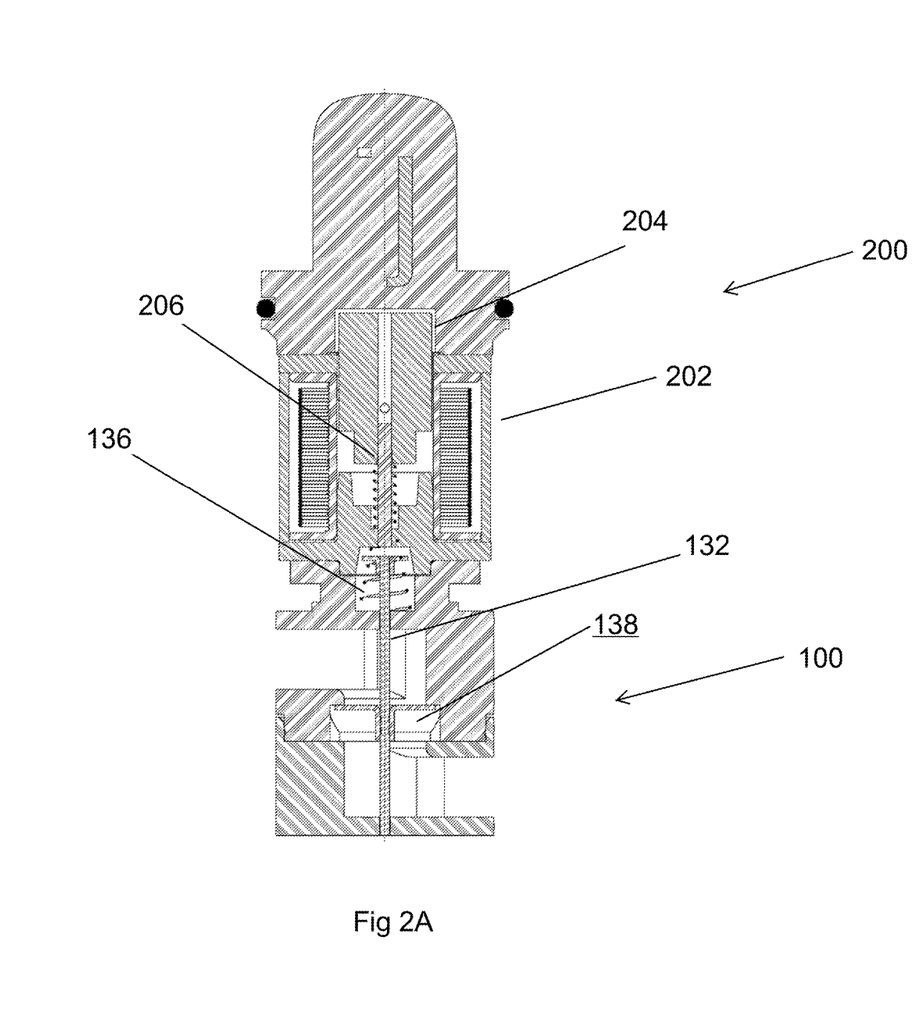
FIG. 2A depicts a front sectional view of a fluid control valve assembly in a first position in accordance with an embodiment of the present invention.

FIGS. 2A-2D depict a non-limiting fluid control valve assembly, assembly 200, in accordance with an embodiment of the present invention. As shown in FIG. 2A, the assembly 200 comprises the valve 100 as described above. In the embodiment illustrated, the valve 100 is coupled to an actuator. In the non-limiting embodiment illustrated, the actuator is a solenoid 202 having a movable armature 204 supported for linear displacement between at least the first position of FIGS. 2A, 2B and a second position of FIGS. 2C, 2D. The armature is coupled to the valve stem 132 via a pin 206 directly linked to the armature 204 and moving with the armature from a first position to a second position. The pin 206 abuts a portion of the valve member 130, for example the valve stem 132, such that the valve member 130 and the sealing element 134 are displaced in response to the displacement of the armature 204. For example, when the armature is in the first position of FIGS. 2A and 2B, the valve member 130 is in the corresponding first valve position. A resilient member 136, for example a spring, urges the valve stem 132 and the armature 204 into the first position. When the armature 204 is in the second position of FIGS. 2C and 2D, the valve stem 132 is displaced to the corresponding second valve position.

Figure 2B:
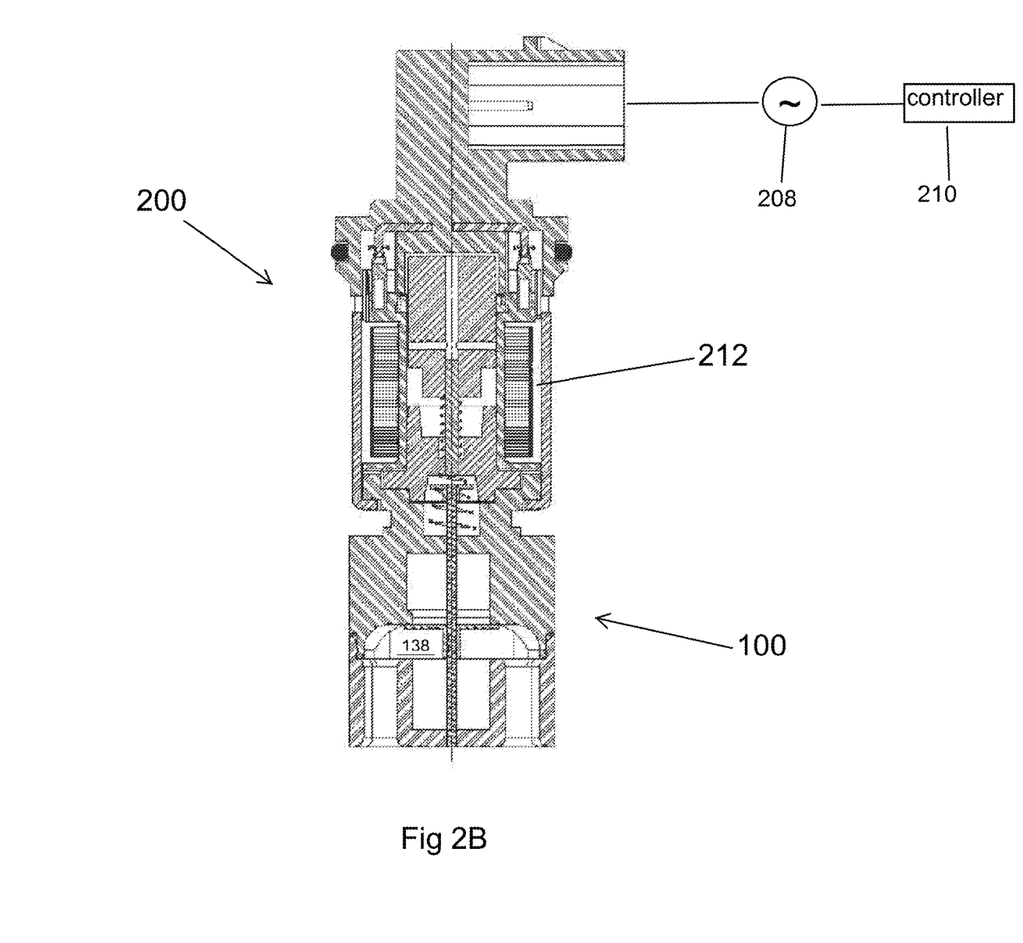
FIG. 2B depicts a side a side sectional view of the valve of FIG. 2A.
Figure 2C:
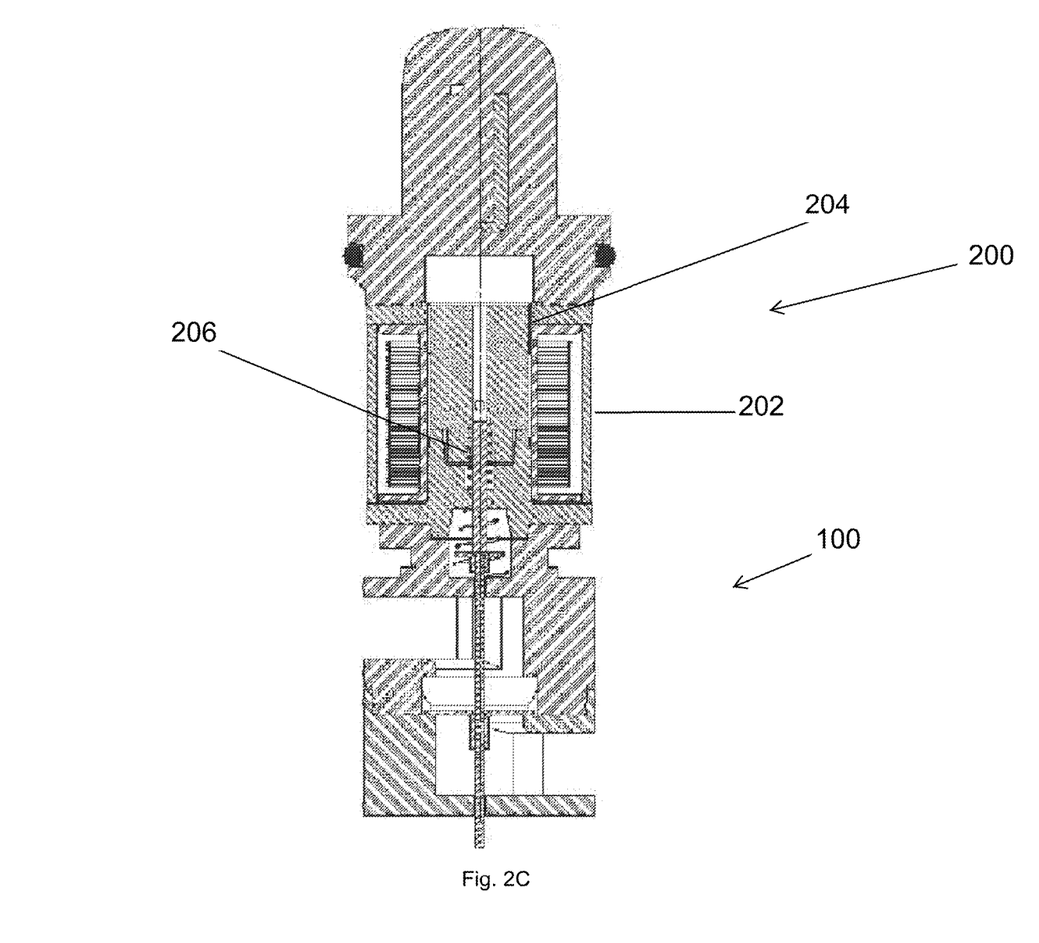
FIG. 2C depicts a front sectional view of a fluid control valve in a second position in accordance with an embodiment of the present invention.
Figure 2D:
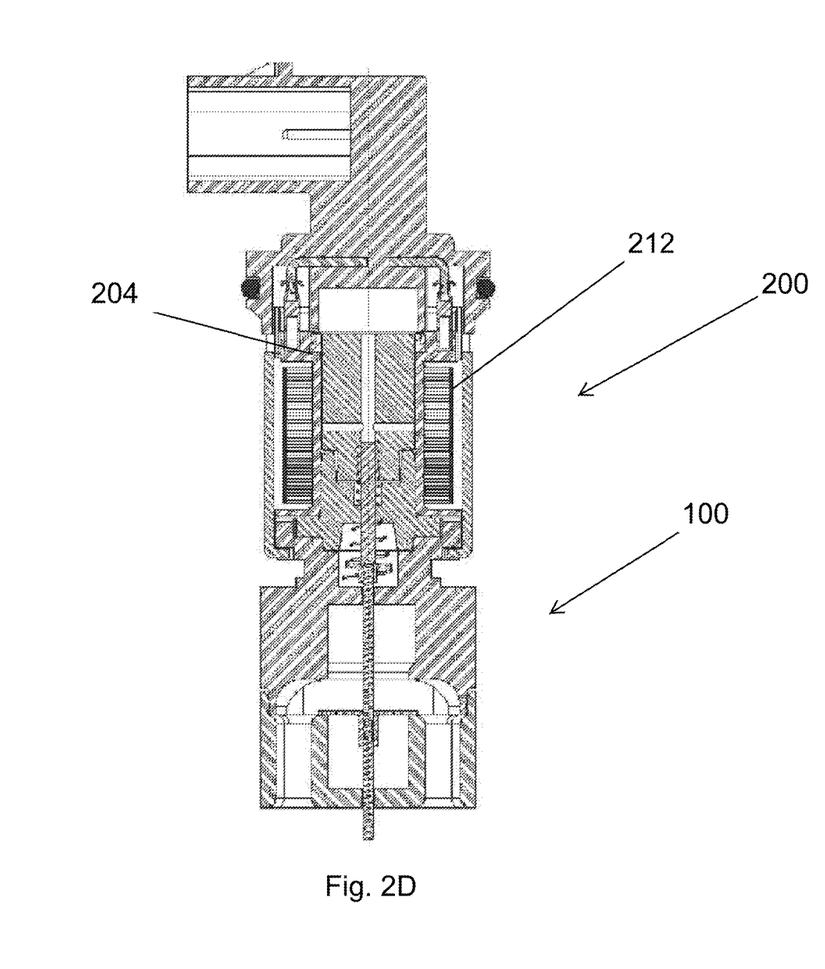
FIG. 2D depicts a side sectional view of the valve of FIG. 2C.

A coil 212 in the solenoid 202 is electrically coupled to a power source 208 controlled by a controller 210 for providing a selectable electrical signal, such as a current, to the coil 212 as illustrated in FIG. 2B. The armature 204 is movable in response to a current applied to the coil 212. The controller 210 may provide at least a first electrical signal and a second electrical signal to the coil 212 corresponding to a first energy condition and a second energy condition, respectively. For example, the first electrical signal may be a 0 ampere current corresponding to a de-energized solenoid condition and the second electrical signal may correspond to a greater, or non-zero ampere, current corresponding to an energized solenoid condition. The first energy condition moves the armature to a first position corresponding to the first valve position and the second energy condition moves the armature to a second position corresponding to the second valve position.

Thus a fluid control valve and a fluid control valve assembly are provided herein. The inventive fluid control valve and assembly advantageously provides a reliable, accurate, and responsive thermal management valve that may improve the performance of a mechanical system, such as an automotive transmission.

Those of ordinary skill in the art may recognize that many modification and variations of the above may be implemented without departing from the spirit or scope of the following claims. For example, although reference to an automotive transmission is made, other mechanical systems sensitive to thermal conditions for optimum performance may benefit from the disclosed fluid control valve and valve system.

What is claimed is:

1. A fluid control valve, comprising:
   a first valve body including an outlet, a first inlet channel defining a first flow direction, and a first cavity formed through an upper surface of the first valve body in fluid communication with the first inlet;
   a second valve body having a bottom surface disposed on and coupled in a fluid-tight manner to the upper surface of the first valve body, the second valve body including a second inlet channel defining a second flow direction and a second cavity having a lip, the second cavity formed through the bottom surface of the second valve body and in fluid communication with the second inlet; and
   a valve member, including a valve stem having a distal portion, a middle portion and a proximal portion, and a sealing element disposed on the middle portion of the valve stem, the sealing element is a disk with opposite flat upper and lower sealing surfaces extending substantially parallel to the first and second flow directions, wherein
   the outlet is in selectable fluid communication with the first inlet and the second inlet,
   an opening of the first inlet channel is formed through a first outer side wall of the first valve body,
   an opening of the second inlet channel is formed through a first outer side wall of the second valve body,
   the first cavity extends a first radial distance from the valve member to a side wall of the first cavity and the second cavity extends a second radial distance from the valve member and to a side wall of the second cavity, the first radial distance being greater than the second radial distance such that a ledge is formed between the side wall of the first cavity and the side wall of the second cavity on a portion of the upper surface of the first valve body,
   the valve stem extends in a first direction between the first valve body and the second valve body, perpendicular to the first inlet channel and the second inlet channel, supported within the first valve body and the second valve body and configured to be displaced in the first direction between at least a first valve position and a second valve position, and
   the upper flat sealing surface of the sealing element presses on the lip in the first valve position and the lower flat sealing surface of the sealing element is located within the second valve body and presses on the ledge in the second valve position.

2. The valve of claim 1, wherein the first valve position opens the outlet to fluid communication with the first inlet and closes the outlet to fluid communication with the second inlet, and the second valve position opens the outlet to fluid communication with the second inlet and closes the outlet to fluid communication with the first inlet.

3. The valve of claim 1, wherein a resilient member urges the valve member in a direction corresponding toward the first valve position.

4. The valve of claim 1, wherein a portion of the second cavity, the lower flat surface of the sealing element, and the upper surface of the first valve body define a plenum open to the first inlet and the outlet in the first valve position.

5. The valve of claim 4, wherein the second cavity, the flat upper surface of the sealing element, and a portion of the upper surface of the first valve body define the plenum open to the second inlet and the outlet in the second valve position.

6. The valve of claim 1, wherein the sealing element is disposed in the second cavity with both the flat upper surface and the flat lower surface being substantially perpendicular to the first direction.

7. The valve of claim 1, wherein the outlet comprises one or more passages formed through the first valve body from a lower surface to the upper surface.

8. The valve of claim 7, wherein the one or more passages are in fluid communication with the second cavity when the upper surface of the first valve body and the bottom surface of the second valve body are in the abutting fluid-tight arrangement.

9. The valve of claim 7, wherein the one or more passages are formed adjacent to the first cavity and an outer side wall.

10. The valve of claim 7, wherein the lower surface of the first valve body is configured for fluid-tight coupling to a receiver.

11. A fluid control valve assembly, comprising:
    a first valve body including an outlet, a first inlet channel, and a first cavity formed through an upper surface of the first valve body, the first cavity in fluid communication with the first inlet;
    a second valve body having a bottom surface disposed on and coupled in a fluid-tight manner to the upper surface of the first valve body, the second valve body including a second inlet channel and a second cavity having a lip, the second cavity formed through the bottom surface of the second valve body and in fluid communication with the second inlet;
    an actuator having a movable armature supported for linear displacement between at least a first position and a second position; and
    a valve member including a valve stem having a distal portion, a middle portion and a proximal portion, and a sealing element disposed on the middle portion of the valve stem having upper and lower sealing surfaces, the valve stem coupled to the armature and supported within the first valve body and second valve body and configured to be displaced in a first direction between at least a first valve position and a second valve position in response to the linear displacement of the armature, wherein
    the outlet is in selectable fluid communication with the first inlet and the second inlet,
    an opening of the first inlet channel is formed through a first outer side wall of the first valve body, an opening of the second inlet channel is formed through a first outer side wall of the second valve body, the first cavity extends a first radial distance from the valve member to a side wall of the first cavity and the second cavity extends a second radial distance from the valve member and to a side wall of the second cavity, the first radial distance being greater than the second radial distance such that a ledge is formed between the side wall of the first cavity and the side wall of the second cavity on a portion of the upper surface of the first valve body, the valve stem extends in the first direction between the first valve body and the second valve body, perpendicular to the first inlet channel and the second inlet channel, and the lower sealing surface of the sealing element is located within the second valve body and presses on the ledge in the second valve position to allow fluid communication from the second inlet channel, along the upper sealing surface of the sealing element, to the outlet.

12. The assembly of claim 11 wherein a resilient element urges the movable armature toward the first position.

13. The assembly of claim 11, wherein the first valve position opens the outlet to fluid communication along the lower sealing surface of the sealing element to first inlet and closes the outlet to fluid communication with the second inlet.

14. The assembly of claim 11, wherein a portion of the second cavity, the sealing element, and the upper surface of the first valve body forms a plenum open to the first inlet and the outlet in the first valve position.

15. The assembly of claim 11, wherein the second cavity, the sealing element, and the upper surface of the first valve body forms a plenum open to the second inlet and the outlet in the second valve position.

16. The assembly of claim 11 wherein the actuator is a solenoid having a coil wherein the armature is movable in response to an electrical current applied to the coil.

17. The assembly of claim 16, wherein the armature is coupled to the valve stem via a pin directly linked to the armature and abutting a portion of the valve member.

18. The assembly of claim 16, wherein the first position corresponds to a first energy condition and the second position corresponds to a second energy condition.

19. The assembly of claim 18, wherein the first energy condition corresponds to a first current applied to the coil and the second energy condition corresponds to a second current applied to the coil.

20. The assembly of claim 19, wherein the first current is a 0 ampere current and the second current is greater than the first current.

* * * * *